Dec. 5, 1961  R. SOMMER  3,011,420
PHOTOGRAPHIC CAMERA PROVIDED WITH SHUTTER AND DIAPHRAGM
Filed June 5, 1958
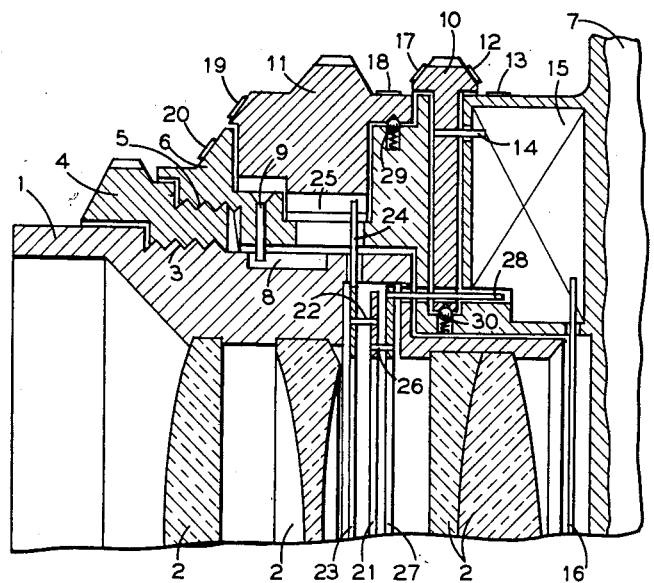
INVENTOR.
Richard Sommer
BY *Blum, Moscovitz,*
*Friedman and Blum*
ATTORNEYS

United States Patent Office 3,011,420
Patented Dec. 5, 1961

3,011,420
PHOTOGRAPHIC CAMERA PROVIDED WITH SHUTTER AND DIAPHRAGM
Richard Sommer, Braunschweig, Germany, assignor to Voigtländer A.G., Braunschweig, Germany, a corporation of Germany
Filed June 5, 1958, Ser. No. 740,016
Claims priority, application Germany July 4, 1957
4 Claims. (Cl. 95—64)

This invention relates to a photographic camera provided with a shutter and a diaphragm and it has particular relation to a photographic camera of this type, in which the diaphragm can be adjusted by means of two adjusters, one of which is coupled with a shutter time adjusting member in the sense of exposure value adjustment, while the other adjuster is freely displaceable by hand.

This construction permits in simple manner adjustment of an exposure value and subsequent selection of a shutter time-diaphragm value-combination corresponding to said exposure value. One of the diaphragm adjusters is adjustable by reference to a scale of exposure values so that, upon adjustment of an exposure value, the diaphragm is adjusted to such value as to yield, together with the then adjusted shutter time value, a combination corresponding to said exposure value. If the shutter time adjusting member is then subsequently adjusted to a value corresponding to the picture taking conditions, due to being coupled with the other diaphragm adjuster, the diaphragm will be correctly adjusted in conformity with the exposure value.

A known construction of this type is housed by the casing of a central shutter, whereby the diaphragm is fixedly arranged at a definite point. In the case of structural junction with an objective mount the lenses are likewise fixedly arranged relative to the shutter, so that in adjustment to distance by displacement of the total objective, the entire shutter must also take part in this displacement. Such displacement is undesirable, for example, if the device for adjustment of shutter times and of the diaphragm is coupled with parts which are fixedly arranged in the camera body, e.g. with an exposure meter.

According to the present invention, in a camera of the above mentioned type the two diaphragm adjusters are non-rotatably coupled with their adjusting means in such a manner that the diaphragm is axially displaceable relative to the adjusting means which are relatively stationary with respect to axial movement, and whereby such non-rotatable coupling is maintained in all positions of axial adjustment. Thus, the entire objective and the diaphragm, which preferably is fixedly arranged between the objective lenses, can be moved axially relative to the adjusting means, for the purpose of adjustment of the objective with respect to distance. The adjusting means can be then coupled in simple manner with an exposure meter fixedly built-in in the camera, whereby, in comparison with devices known from the art, an advantageous adjustment of the correct exposure value can be effected.

This invention further has advantages in cameras of the type in which the shutter is a focal-plane shutter which is inserted in the camera and the time-adjusting member of which consists, in conventional manner, of an adjusting ring co-axially arranged relative to the axis of the picture taking objective. The coupling means between this ring, arranged in stationary manner in the objective mount body, and the slit-type shutter mechanism may be of simple design. The objective and the diaphragm fixedly arranged therein thus can be moved axially relative to the time-adjusting member.

It is preferred to fixedly connect the coupling members, provided between the two diaphragm adjusters and their adjusting means, with one of the parts to be coupled, with each coupling member having an axially displaceable engagement with the other part.

The coupling member between one of the diaphragm adjusters and the shutter time adjusting member preferably comprises a coupling pin having one end fixedly seated in the diaphragm adjuster, and its other end axially slidably engaging the shutter time adjusting member, while the ring-shaped adjusting means connected with the other diaphragm adjuster is provided with a groove extending in the direction of the optical axis, said groove being engaged by a flap, or the like, fixed to this diaphragm adjuster. The part which carries said groove may be the adjusting member proper or a part connected therewith.

The structures embodying the present invention can be used with advantage also in cameras provided with exchangeable objectives. The mount of the exchangeable objective may contain the diaphragm provided with two diaphragm adjusters and the adjusting means connected with one of the diaphragm adjusters. The other diaphragm adjuster will then be coupled with the time adjusting member (fixedly arranged in the camera) of the shutter when the exchangeable objective is connected with the camera.

The appended drawing serves to illustrate a specific embodiment of and best mode for carrying out the invention, to which the invention is not limited.

This drawing illustrates, in axial section, a device according to the invention, i.e. an objective mount which includes the adjusting device of the invention, said objective mount forming a structural unit with the casing of a shutter.

Referring now to the drawing in detail, the lenses 2, which form the picture-taking objective, are held by mount part 1. This mount part has an adjusting thread 3 threadedly engaged with an adjusting ring 4, which is threadedly engaged in a screw thread 5 of objective mount body 6. This body 6 is either fixedly or releasably connected with camera body 7. Mount part 1 is provided with a groove 8, which extends parallel with the optical axis and is engaged by a pin 9, or the like, fixedly seated in objective mount body 6. In this manner, mount part 1 is held against rotation relative to objective mount body 6, so that, upon turning adjusting ring 4, mount part 1 moves axially in objective mount body 6.

Objective mount body 6 forms a structural unit with the casing of a central shutter. In the body 6, a shutter time adjusting ring 10 and a diaphragm adjusting ring 11 are arranged. Shutter time adjusting ring 10 carries an adjusting mark 12, which cooperates with a shutter time scale 13 arranged on body 6. Shutter time adjusting ring 10 is connected over a coupling member 14 with the mechanism 15 of the shutter. Only one of the diaphragm sectors is shown at 16 in the drawing.

Shutter time adjusting ring 10 also carries a mark 17, which cooperates with a diaphragm scale 18 arranged on diaphragm adjusting ring 11. The two marks 12 and 17 can be combined in a single line, one end of which points to scale 13 and the other to scale 18. Diaphragm adjusting ring 11 carries an additional scale 19 of exposure values, said scale being adjustable relative to a mark 20 provided on objective mount body 6.

Between lenses 2, an iris diaphragm is arranged. For the sake of clearness, only one of the diaphragm lamellae is shown at 21 in the drawing. Control pin 22 seated in said lamella engages one of the control cams of ring 23 for controlling the lamellae, said ring being rotatably arranged in mount part 1. Ring 23 is provided with a flap 24, which passes through openings in mount part 1 and objective mount body 6 and has its free end engaged in a groove 25 provided in diaphragm adjusting ring 11 and which extends parallel to the optical axis. In this manner, control ring 23 for the lamellae and diaphragm adjusting ring 11 are non-rotatably coupled with each other.

This non-rotatable coupling is maintained when, in an objective adjustment to distance, mount part 1 and together with it the iris diaphragm, are displaced axially relative to objective mount body 6 and diaphragm adjusting ring 11 arranged therein, because flap 24 of lamellae control ring 23 slides along groove 25 of diaphragm adjusting ring 11.

Hinge pin 26 of diaphragm lamella 21 is seated in ring 27. This ring too is rotatably arranged in mount part 1, so that lamellae 21 of the iris diaphragm can be displaced by turning control ring 23 as well as by turning bearing ring 27. Such iris diaphragms provided with two diaphragm adjusters have been known by themselves. It has likewise been known to couple one of the adjusters of such iris diaphragms with the shutter time adjusting member.

In the adjusting device according to the present invention this coupling is likewise used, whereby coupling pin 28 fixedly seated in ring 27 engages a bore of shutter time adjusting ring 10. Coupling pin 28 is of such length that this coupling is still maintained when, in an adjustment to distance of the picture taking objective, mount part 1 and, together with it, the iris diaphragm are displaced axially relative to the objective mount body 6 and the shutter time adjusting ring arranged therein, because coupling pin 28 is capable of movement in axial direction in the bore of shutter time adjusting ring 10.

The adjusting movements of the iris diaphragm are adapted to the adjusting movements of the shutter adjusting ring in such a manner that the contemplated coupling between these devices will correspond to correct exposure. Thus, when the shutter time is adjusted from a certain value to the double thereof, the iris diaphragm will be closed by one diaphragm value.

The value to which the iris diaphragm is adjusted in each case, is indicated by scale 18 and mark 17. If this diaphragm opening is changed by turning shutter time adjusting ring 10, movement of mark 17 arranged on ring 10, relative to diaphragm scale 18, which remains stationary, will indicate the adjusted value in each case. If, however, the iris diaphragm is adjusted by turning diaphragm adjusting ring 11, diaphragm scale 18, which moves relative to mark 17, which is now stationary, will indicate the adjusted value in the respective case.

At the same time the arrangement of scales 19, 20 indicates the exposure value formed by combination of the shutter time value with the diaphragm value, in each case. Upon changing the shutter time and diaphragm opening by displacement of shutter time adjusting ring 10, scale 19, 20 is not displaced, because there is no change of the exposure value. Scale 19, 20 is displaced only when diaphragm adjusting ring 11 is turned, because only the diaphragm opening is changed, while the shutter time remains unchanged.

The shutter time adjusting ring 10, as well as the diaphragm adjusting ring 11, are acted upon by stop devices 30 and 29, respectively, and these stop devices arrest said adjusting members in the positions adjusted to the desired values. The stop device acting on diaphragm adjusting ring 11 may be provided with such fine sub-division that ring 11 may be arrested in positions located between reading points of the scale arrangement 19, 20.

In taking a photograph picture with the above described camera, first adjustment to distance has to be carried out by turning ring 4. Thereby the entire objective, including the built-in diaphragm is displaced in axial direction without change of the adjusted diaphragm opening. Subsequently, either first the shutter and then the diaphragm or, in the reverse order, first the diaphragm and then the shutter time are adjusted by the axially stationary adjusting rings 10 and 11. If the adjustment is supposed to be carried out according to a measured light value, then—after adjustment of the distance—first the diaphragm adjusting ring 11, with its scale 19 of the exposure values, has to be adjusted to the mark 20 which is stationary in the camera casing. Subsequently—depending on whether definition in depth or sharpness of movement is considered more important— adjusting ring 10 should be adjusted either with respect to diaphragm scale 18 or with respect to shutter time adjusting scale 13. As all necessary adjustments have thus been made, the shutter can be released.

It will be understood from the above that this invention is not limited to the specific designs, constructions, arrangements and other details specifically described above and illustrated in the drawings and can be carried out with various modifications without departing from the scope of the invention as defined in the appended claims.

What is claimed is:

1. A photographic camera comprising, in combination, an objective mount fixed relatively to said camera; an objective lens retainer non-rotatably mounted in said mount for axial adjustment relative thereto; an iris diaphragm in said retainer, including a bearing ring and a control ring independently relatively rotatable but axially fixed in said retainer and coaxial with the objective lens system, and lamellae each pivotally connected to both of said rings, whereby the diaphragm aperture is adjustable by rotation of either of said rings relative to the other thereof; first and second exposure factor setting rings independently rotatably mounted on said mount coaxial with the objective lens system and fixed against axial movement relative to said mount; first coupling means interconnecting said first setting ring and said bearing ring for conjoint rotation, and including a first coupling element constantly coupled to both said first setting ring and said bearing ring, and axially movable relative to at least one thereof; and second coupling means interconnecting said second setting ring and said control ring for conjoint rotation, and including a second coupling element constantly coupled to both said second setting ring and said control ring, and axially movable relative to at least one thereof; whereby rotation of either of said setting rings relative to the other thereof is effective to adjust the diaphragm aperture irrespective of the position of said retainer axially of said objective mount.

2. A photographic camera as claimed in claim 1, in which said first setting ring comprises a shutter time setting ring and said second setting ring comprises a diaphragm aperture setting ring.

3. A photographic camera as claimed in claim 1, in which said first coupling element is fixed to said bearing ring and axially movable relative to said first setting ring; and said second coupling element is fixed relative to said control ring and axially movable relative to said second setting ring.

4. A photographic camera as claimed in claim 3, in which said first coupling element comprises a relatively elongated pin extending axially of the objective lens system and having one end fixed to said bearing ring and the other end extending through an aperture in said first setting ring; and said second coupling element comprises a radial extension of said control ring conformingly engaged in an axially extending groove in the inner periphery of said second setting ring.

References Cited in the file of this patent
FOREIGN PATENTS 1,126,831     France _____ July 30, 1956